UNITED STATES PATENT OFFICE.

FREDERICK LAREN GALLUP, OF MEDIA, PENNSYLVANIA, ASSIGNOR TO E. I. DU PONT DE NEMOURS POWDER COMPANY, OF WILMINGTON, DELAWARE, A CORPORATION OF NEW JERSEY.

PROCESS OF MAKING GRANULAR NITRATE OF AMMONIA.

1,131,361.      Specification of Letters Patent.      Patented Mar. 9, 1915.

No Drawing. Application filed May 18, 1912, Serial No. 698,344. Renewed July 28, 1914. Serial No. 853,724.

*To all whom it may concern:*

Be it known that I, FREDERICK L. GALLUP, of Media, in the county of Delaware, and in the State of Pennsylvania, have invented a certain new and useful Improvement in Processes of Making Granular Nitrate of Ammonia, and do hereby declare that the following is a full, clear, and exact description thereof.

The object of my invention has been to provide a process of producing nitrate of ammonia in granular form, whereby nitrate of ammonia can be produced in grains of any desired size, and particularly globular grains of any desired size, and to such ends my invention consists in the process of making granular nitrate of ammonia hereinafter specified.

In general, my process may be illustrated by the process described in the patent to Russell S. Penniman, No. 448,361, patented March 17th, 1891, except as hereinafter stated.

I have found that by supplying the ammonium nitrate liquor to the graining pan *a* of the Penniman apparatus in condition so that it shall have a certain temperature of crystallization, I can produce grains of ammonium nitrate of approximately a desired size. If the liquor have a relatively high temperature of crystallization, the grains of ammonium nitrate will be relatively large. If the ammonium nitrate have a temperature of crystallization which is relatively low, the resulting grains of ammonium nitrate will be relatively small.

In the practice of my process by the Penniman apparatus, the ammonium nitrate liquor is concentrated in the pans D and D'; that is, the water in the liquor is evaporated, and the amount of water present in the liquor determines the temperature of crystallization. When any given sample of ammonium nitrate liquor is allowed to cool, a thermometer immersed in such liquor will show a falling temperature until the crystallizing point is reached, at which time the reading on the thermometer becomes constant for a short space of time before it again begins to fall with the loss of heat by the liquor. This point on the thermometer reading, where the temperature becomes constant, represents the crystallizing temperature. Another indication of the temperature of crystallization is also available in that the ammonium nitrate begins to assume a mushy state at the time the temperature of crystallization is reached. Therefore, in the practice of my process, from time to time as the concentration progresses in one of the pans D, I take samples of the liquor therefrom and test for the temperature of crystallization. In this manner I continue the concentration of the liquor in the concentrating pan until it has reached a point where it has the desired temperature of crystallization, and I then allow it to pass into the granulating pan *a*, where it is treated as stated in the said patent, and assumes a granular form. I find that the cooling of the concentrated liquor in the graining pan *a* should not be too rapid as it would interfere with the uniformity of the size of grains produced.

As a specific illustration of the manner of the practice of my process, if it is desired to produce ammonium nitrate of which not more than 5% will be held on a 40 mesh standard sieve, and at least 25% of which will pass a 100 mesh sieve, but usually from 40 to 90% of which will pass the 100 mesh sieve, the following procedure may be used: A crystallizing temperature of the evaporated liquor in the high pan should be from 275° to 280° F. This crystallizing temperature can be determined by taking a small dipper or ladleful from the high pan, and stirring it with a spoon or spatula, while watching a standard chemical thermometer held in the ladle during the stirring. As the liquor reaches its crystallizing point it commences to get mushy, at which time the reading on the thermometer becomes constant for a short space of time. The mushy state of the ammonium nitrate occurs at the same time and may be used as a check on the thermometer reading. If a crystallizing temperature of from 300° to 305° F. is used, the point and temperature of crystallization is determined as before, and a coarse hard granular product will be obtained and not more than 5% will be held on a 10 mesh standard sieve, and not more than 5% will pass a 60 mesh standard sieve.

By my process, the grains of ammonium nitrate are substantially globular and look something like water-worn gravel. In such form, the ammonium nitrate less easily absorbs moisture from the atmosphere, and is therefore more permanent and stable in its character.

I claim:

1. The process of making granular ammonium nitrate, which consists in granulating ammonium nitrate liquor at a definite degree of concentration according to the size of grains desired.

2. The process of making granular ammonium nitrate, which consists in crystallizing and stirring ammonium nitrate liquor having a definite degree of concentration according to the size of grains desired.

3. The process of making granular ammonium nitrate, which consists in varying the degree of concentration of ammonium nitrate liquor according to the size of grains desired, and stirring such liquor while crystallizing it.

4. The process of making granular ammonium nitrate, which consists in concentrating ammonium nitrate liquor to a predetermined concentration according to the size of grain desired and cooling while stirring it.

5. The process of making granular ammonium nitrate, consisting in concentrating ammonium nitrate liquor to a predetermined concentration according to the size of grain desired, and crystallizing such liquor by stirring and aerating, while cooling it.

In testimony that I claim the foregoing I have hereunto set my hand.

FREDERICK LAREN GALLUP.

Witnesses:
C. R. MUDGE,
CLIFFORD A. WOODBURY.

DISCLAIMER.

1,131,361.—*Frederick Laren Gallup*, Media, Pa. PROCESS OF MAKING GRANULAR NITRATE OF AMMONIA. Patent dated March 9, 1915. Disclaimer filed March 26, 1925, by the assignee, *E. I. du Pont de Nemours & Company*.

Hereby enters its disclaimer to such parts of the thing patented as it does not choose to claim or to hold by virtue of the above-mentioned patent or assignments as follows:

To the process specified in claim 1, except as applied to the concentration of ammonium nitrate liquors to crystallizing temperatures at which an appreciable amount of water is still contained in the liquor when cooling is begun.

To the process specified in claim 2, except when the step of crystallization is so carried out as to cool the ammonium nitrate liquor relatively slowly and to a degree of concentration at which an appreciable amount of water is still contained in the liquor when cooling is begun.

To the process specified in claim 4, except when the ammonium-nitrate liquor is cooled relatively slowly.

[*Official Gazette May 5, 1925.*]

DISCLAIMER.

1,131,361.—*Frederick Laren Gallup*, Media, Pa. PROCESS OF MAKING GRANULAR NITRATE OF AMMONIA. Patent dated March 9, 1915. Disclaimer filed October 28, 1925, by the assignee, *E. I. du Pont de Nemours and Company*.

Hereby enters its disclaimer to such parts of the thing patented as it does not choose to claim or to hold by virtue of the above-mentioned patent or assignments as follows:

To the process specified in claims 1 and 3 as applied to the production of small, fine grains of ammonium nitrate.

[*Official Gazette November 24, 1925.*]